United States Patent Office 3,773,751
Patented Nov. 20, 1973

---

3,773,751
SYNTHESIS OF NITROAROMATIC-AZOPHENOLS
Houston George Brooks, Jr., Somerset, N.J., assignor to American Cyanamid Company, Stamford, Conn.
No Drawing. Filed Sept. 8, 1969, Ser. No. 856,210
Int. Cl. C07c 107/06
U.S. Cl. 260—206                    9 Claims

ABSTRACT OF THE DISCLOSURE

A process for coupling an o-nitroaniline and a water immiscible para-alkylphenol in an aqueous basic reaction medium to obtain a nitrophenylazophenol. The novel features of the process are the presence of an inert water immiscible solvent and the use of a sparingly soluble base. Typically, o-nitroaniline and p-t-octylphenol are coupled in a reaction system having separate aqueous and naphtha phases and excess calcium hydroxide, some of which is in the undissolved solid state. The resultant azophenols are in pure form and can be used to prepare 2-(hydroxyphenyl)benzotriazoles.

---

This invention relates to an improved process for the preparation of nitroaromatic-azophenols. More particularly, it relates to an improved process for the coupling of a higher p-alkyl substituted phenol with a diazonium salt of an orthonitro aniline to form a nitrophenylazophenol which can be triazolized without further purification.

Hydroxyphenyl benzotriazoles are effective UV absorbers for the protection of light sensitive polymers, particularly polyolefins. Thus, in U.S. Pat. 3,004,896, issued Oct. 17, 1961 to Heller et al., such benzotriazoles having lower alkyl substituents on the phenyl moieties are disclosed. It was found that similar compounds containing higher alkyl substituents on the phenyl ring are capable of providing longer lasting stability to polyolefins. The higher alkyl substituted derivatives are disclosed in U.S. Pat. 3,230,194, issued Jan. 18, 1966 to Boyle.

Although higher alkyl homologues mentioned above have more lasting stabilizing effects, the lower alkyl homologues are more easily prepared. Thus, use of conventional procedures leads to the lower alkyl homologues in relatively high yields and in relatively pure form. This is not the case with the preparation of the higher homologues, apparently due to the fact that the higher homologues are less soluble in strong bases than the lower homologues.

Hydroxyphenyl benzotriazoles are prepared by a reaction sequence represented by the following equations:

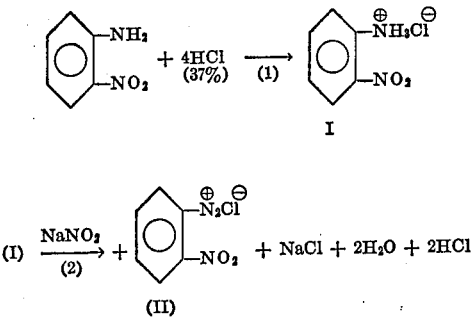

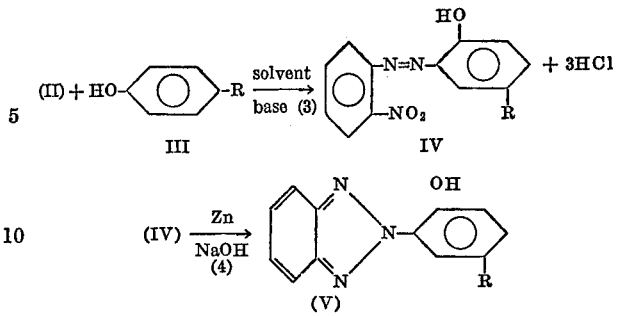

Under normal circumstances, an appropriately substituted ortho-nitroaniline is diazotized and coupled in a strong base with the phenolic compound prior to reductive triazolization to the hydroxyphenyl benzotriazole. One such procedure is described in Example 1 of U.S. Pat. 3,230,194; and an alternative one is described in Example 1 of U.S. Pat. 3,018,269. These procedures work well for triazoles wherein R is a lower alkyl group; however, preparation of higher alkyl homologues according to either of these procedures is unsatisfactory in that the product is obtained in impure form and in low yields. It is theorized that the difference in yields is due to the fact that the higher alkyl phenols are sparingly soluble in strong bases such as sodium hydroxide normally used in the coupling reaction. The higher alkyl phenols therefore tend to form insoluble soap-like compounds. However, the coupling action requires that the phenol be in solution to form phenoxide ions. Since very little of the higher alkyl phenol is free to form phenoxide ions there is always a large excess of strong base in the reaction medium. The diazonium chloride is not stable in the presence of base and decomposes, leading to low yields and tarry by-products. In the case of the lower alkyl homologues, their greater solubility leads to a more rapid reaction between the phenol and the sodium hydroxide thereby avoiding the presence of large excesses of the strong base.

It is an object of the present invention to provide a process whereby higher alkyl substituted 2-hydroxyphenyl benzotriazoles can be prepared in good yields and in relatively pure form from orthohydroxy aniline. It is a further object of the present invention to provide a practical and efficient method for the coupling of a higher p-alkyl substituted phenol with the diazonium chloride of an orthonitro aniline whereby the resultant nitrophenylazophenol is obtained in relatively high yields and in a form which is sufficiently pure to be triazolized without further purification.

These and other objects are accomplished in accordance with the present invention by conducting the coupling reaction of the nitrobenzene diazonium chloride and the higher alkyl phenol in a 3-phase system using a sparingly soluble alkaline earth metal oxide or hydroxide at a pH in the range of about 7 to 10. The novel feature of the present inevntion is in the conjoint use of a 3-phase reaction system and a sparingly soluble base. It is believed that the reaction takes place at the interface between the diazonium chloride solution and the aqueous base dispersion. A surfactant may be used if it is desired to form a more stable dispersion of the base in the aqueous phase.

Suitable sparingly soluble bases are alkaline earth metal oxides or hydroxides such as oxides or hydroxides of calcium, barium, magnesium or strontium. Preferably, calcium oxide or hydroxide are used because these materials are not costly and they perform their function efficiently.

The process of the present invention is applicable to the coupling of phenolic compounds which have limited solubility in strong aqueous bases. The phenols which are included in this category are those represented by the following Formula III:

(III)

wherein R is an alkyl group of at least six carbons, preferably one having 6–18 carbons. The reaction of this invention is carried out by forming a mixture of the phenol, an inert water immiscible organic solvent, and an aqueous base and contacting the same with the diazonium chloride obtained from any suitable source. Preferably, the diazonium solution is added to the stirred 3-phase reaction medium at a rate such as to maintain the pH in a range of 7 to 10. The temperature during the coupling reaction should be maintained in the range of −10° C. to about 10° C., preferably minus 5° C. to about 0° C.

As the highly acidic diazonium chloride solution is added to the stirred mixture of the phenol, inert organic solvent, and the aqueous base, the pH of the aqueous phase is reduced from about pH 12 to the range of about 7 to 10. Coupling occurs and concurrently, more of the alkaline earth compound dissolves until all the diazonium chloride has been added and the coupling is completed. The purity of the product is high since there is minimal decomposition of the diazonium chloride, as a consequence of the fact that the base is sparingly soluble and the aqueous solution does not contain the base in excess of the amount needed for reaction. The absence of high concentration of base means less decomposition of the diazonium chloride, which is unstable in the presence of base. If it is desired, a surfactant can be used to aid in the dispersion of the base in the aqueous phase. Alkylaryl sulfonates or sulfates and polyoxyethylenes are suitable wetting agents for this purpose, but it is to be understood that the reaction of the present invention can be conducted to good advantage without any wetting agent present. The solvent should be present in a concentration which is sufficient to dissolve the product as it is formed.

Suitable as inert water immiscible solvents are liquids such as hexane, heptane, benzene, toluene, xylene, naphtha, halogenated aliphatic and aromatic hydrocarbons and nitrobenzene. Any solvent which is inert and water immiscible may be used for the purposes of this invention.

The reaction of this invention can be used for coupling the diazonium chloride of ortho-nitroaniline and other diazonium chlorides having substituents which are inert to the coupling reaction. For purposes of brevity, the specific description is limited to the most widely used unsubstituted compounds.

The stoichiometry of the coupling reaction when carried out in accordance with the present invention is the same as when the reaction is effected under conventional conditions. Thus, the coupling reaction involves the addition of one mole of the diazonium chloride for each mole of the phenol and the alkaline earth oxide or hydroxide present in the reaction mixture.

The purocess of this invention yields the desired product in highly pure form. Where the product is crystalline in pure form, it is obtained as crystals by following this invention. This is in contrast to the processes of the prior art, which lead to impure products, absent a special purification treatment, e.g. recrystallization. As an illustration, the product 2-(2-nitrophenylazo)-4-(1,1,3,3-tetramethylbutyl)phenol as obtained by the process of this invention is a crystalline material with a melting point of 114°–115° C. which is virtually identical with the literature melting point of 113°–115° C. In contrast, the process of U.S. Pat. 3,018,269 gives a semisolid product with a much lower melting point.

Following completion of the coupling reaction, the reaction medium can be acidified and the product isolated, washed and dried. Ordinarily, in the preparation of the triazole, the product is not isolated but is further reacted to effect reductive triazolization to the hydroxybenzotriazole. A suitable triazolization agent is zinc dust and sodium hydroxide.

The following examples are presented to further illustrate the present invention:

EXAMPLE 1

Preparation of 2-(2-nitrophenylazo)-4-(1,1,3,3-tetramethylbutyl)phenol-naphtha as solvent

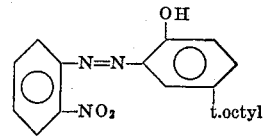

Part A—Diazotization: o-Nitroaniline (138 grams, 1.0 mole) and 250 ml. (3.04 moles) of 37% hydrochloric acid were added to a 2-l. flask with stirring. The resulting thick, smooth slurry was diluted with 400 ml. of water and cooled to about −15° C. Sodium nitrite (75 grams, 1.08 moles) dissolved in 110 ml. of water was added gradually while maintaining the temperature at 0 to 5° C. to give the desired diazonium chloride.

Part B.—Coupling: 4-p-tert. octylphenol (515 grams, 0.25 mole), 200 ml. of naphtha, 50 ml. of water and calcium hydroxide (24.4 grams, 0.33 mole) were charged into a 1 liter flask. Ice (175 grams) was added and the temperature brought to 0° C. The previously prepared diazonium chloride was charged as rapidly as possible while holding the temperature at −5° to 5° C. The mixture was stirred for 2 hours at 0° C. and then 30 ml. of concentrated HCl was added to dissolve excess calcium hydroxide. The solution was cooled to 0° to 5° C., the crystals were filtered off and the cake washed with about 100 ml. of 75% isopropanol. The product was dried to constant weight. Yield: 86%, M.P. 114–115° C.

EXAMPLE 2

Preparation of 2-(2-nitrophenylazo)-4-(1,1,3,3-tetramethylbutyl)phenol-heptane as solvent The procedure of Example 1, Part B was followed using heptane instead of naphtha as the solvent. The product had a melting point of 112–114° C. and was obtained in 86% yield.

EXAMPLE 3

Preparation of 2-(2-nitrophenylazo)-4-(1,1,3,3-tetramethylbutyl)phenol-naphtha as solvent Naphtha (115 ml.), water (225 ml.), p-t-octylphenol (58 grams, 0.28 mole) and 17 grams of Surfonic N–95 surfactant are charged into a flask and heated to 50° C. for 30 minutes with stirring. The mixture is cooled to 0° C., and MgO (24.6 grams (0.44 mole) is added. The diazonium chloride (0.28 mole) produced in Example 1, Part A, and 85 ml. of naphtha are added and the mixture is stirred for 1 hour at about 0° C. The mixture is acidified with 75 ml. of conc. HCl, heated to 75° C. The aqueous layer is separated and the organic phase is cooled to 0° C. and filtered. The filter cake is washed with 75% aqueous isopropanol. The yield is 71% of product melting at 113–115° C.

EXAMPLE 4

Into a flask were charged 2,000 milliters of methanol, 206 g. (1.0 mole) of p-tert.-octylphenol, and 100 g. (1.5 moles) of 50% aqueous sodium hydroxide. The mixture was cooled to 0° to —5° C. Then 0.5 mole of the diazonium chloride produced in Part A of Example 1 was added. Another 1.5 mole portion of 50% aqueous sodium hydroxide and 0.5 mole of the diazonium chloride are added while maintaining the temperature through the addition at 0° to —5° C. After the additions are completed, the temperature is allowed to rise to 20° C. The solids are filtered off and washed with 2 liters of warm water. A product melting at 84 to 100° C. is obtained. This crude material is recrystallized from 700 milliliters of naphtha to give a yield of 63% of product melting at 114–115° C.

EXAMPLE 5

This example demonstrates the importance of using a sparingly soluble base. A run similar to that of Example 2 except that 0.63 mole of sodium hydroxide was used instead of the calcium hydroxide used therein and the reaction mixture contained 10% excess phenol. The yield of product melting at 113–115° C. was 18%.

EXAMPLE 6

This example demonstrates the effect of substituting a water miscible solvent and a water soluble base for the water immiscible solvent and the sparingly soluble base employed in accordance with the present invention.

A run was conducted in accordance with Example 4 using 750 milliliters of methanol instead of 2 liters of methanol. This ratio of solvent to phenolic reactant corresponds to the ratio of solvent to phenolic reactant used in Example 1 of this application.

The yield of pure product melting at 113–115° C. was only 44%.

EXAMPLE 7

This example shows a procedure using a water miscible solvent in combination with a sparingly soluble base.

To a stirred solution of 138 g. (1.0 mole) of o-nitroaniline in 1 l. of methanol there was added with cooling 360 ml. of conc. hydrochloric acid. The mixture was then cooled slowly to 0° C. and treated by slow dropwise addition with a solution of 74 g. (1.07 mole) of sodium nitrite in 110 ml. of water during a period of 35 minutes. The resulting mixture was stirred for an additional hour and filtered to remove the sodium chloride. The salt was washed with 100 ml. of methanol and the methanol wash was combined with the filtrate.

The above diazonium chloride solution then was added dropwise to a cooled (0° C.) mixture of 206 g. (1.0 mole) of p-tert.-octylphenol and 259 g. (3.5 mole) of calcium hydroxide in 1.9 l. of methanol. When addition of the diazonium salt was complete the mixture was stirred for an additional hour and then acidified slowly with 350 ml. of concentrated hydrochloric acid and 500 ml. of water, stirred for 15 minutes and filtered. The product was washed with two 1 l. portions of 75% isopropyl alcohol, then with 5 l. of water containing 10 g. of Surfonic N-95 surfactant and dried at 65° overnight. The yield of the crude was 229 g. (64.5%); M.P. 109–113° C.

EXAMPLE 8

Preparation of 2 - (2 - nitrophenylazo)-4-(1,1,3,3-tetramethylbutyl)phenol according to Example 1 of U.S. 3,018,269

The procedure of Example 1 of U.S. Pat. 3,018,269 was followed and there was obtained 155 grams of a red-brown semi-solid, as stated in the patent. The semi-solid is extremely impure and thus the yield of pure crystalline material is considerably lower than the actual conversion rate of about 43.7%.

EXAMPLE 9

Preparation of a 2-hydroxyphenyl benzotriazole from the product of Example 1

0.25 mole of the product of Example 1 is dissolved in 200 ml. of VMP naphtha. To this is added 43 grams (0.66 mole) of zinc and 200 ml. of $H_2O$. To this was then added 1.1 moles of 25% NaOH solution over a period of about 4 hours at 50° C. The reaction mixture was held at 50° C. for 1 hour and then 250 ml. of conc. HCl added over 1½ hours. The mixture was stirred for ½ hour and heated to 65–70° C. The aqueous layer was separated, the zinc filtered, the organic layer washed with hot water, the aqueous layer removed and the organic solution cooled to 0° C. The product was filtered and washed with 100 ml. of 75% isopropanol. The product was obtained in 84% yield; M.P. 100°–103° C.

I claim:

1. In a process of reacting an ortho-nitrobenediazonium chloride and a water immiscible para-alkylphenol in an aqueous base at a temperature between —10° C. and about +10° C. whereby the reactants are coupled to give a nitroaromatic-azophenol, the improvement which comprises: Conducting the reaction in the presence of an inert water immiscible solvent and a sparingly water-soluble base selected from the group consisting of alkaline earth oxides and hydroxides, the solvent being present in sufficient quantity to form a separate liquid phase in which the resultant nitroaromatic-azophenol product dissolves as it is produced.

2. The process of claim 1 wherein the diazonium chloride is added to a cooled mixture of the para-alkylphenol, the inert water immiscible solvent, the sparingly soluble base and water.

3. The process of claim 1 wherein the water immiscible solvent is naphtha.

4. The process of claim 1 wherein the water immiscible solvent is heptane.

5. The process of claim 1 wherein the phenol is para-t-octylphenol.

6. The process of claim 1 wherein the diazonium chloride is the diazonium chloride of o-nitroaniline.

7. The process of claim 1 wherein the base is calcium hydroxide or calcium oxide.

8. The process of claim 1 wherein the base is magnesium oxide.

9. The process of claim 1 wherein said para-alkylphenol has the formula

wherein R is an alkyl of 6 to 18 carbons.

References Cited

UNITED STATES PATENTS 3,018,269 1/1962 Bruno _____ 260—45.8 N
3,230,194 1/1966 Boyle _____ 260—45.8 N

OTHER REFERENCES

Venkataraman, The Chem. of Synthetic Dyes, vol. I, Academic Press Inc., New York (1952), p. 411.

LEWIS GOTTS, Primary Examiner

C. F. WARREN, Assistant Examiner

U.S. Cl. X.R.

260—308

UNITED STATES PATENT OFFICE
CERTIFICATE OF CORRECTION

Patent No. 3,773,751           Dated  November 20, 1973

Inventor(s)   Houston George Brooks, Jr.

It is certified that error appears in the above-identified patent and that said Letters Patent are hereby corrected as shown below:

Col. 3, line 71: "purocess" should read -- process --.

Col. 4, line 33: " -15°C. " should read -- -5°C. --.

Col. 6, line 22 (Claim 1): "...-nitrobenediazo..." should read -- ...-nitrobenzenediazo... --.

Signed and sealed this 14th day of May 1974.

(SEAL)
Attest:

EDWARD M.FLETCHER,JR.                C. MARSHALL DANN
Attesting Officer                    Commissioner of Patents